United States Patent [19]
Witter et al.

[11] Patent Number: 5,935,427
[45] Date of Patent: Aug. 10, 1999

[54] SYSTEM FOR DRAINING A LIQUID STORAGE TANK

[75] Inventors: Aldyr Witter, São Leopoldo; Antonio Jorge Leitão Schilling, Porto Alegre; Cláudio Camilo Da Silva, São Leopoldo; Edu Correa Francisco, Sapucaia Do Sul; Artur Rogério Monteiro Marinho, Canoas, all of Brazil

[73] Assignee: Petoleo Brasileiro SA—Petrobras, Brazil

[21] Appl. No.: 08/979,347

[22] Filed: Nov. 26, 1997

[30] Foreign Application Priority Data

Nov. 26, 1996 [BR] Brazil ................................ 9605709

[51] Int. Cl.⁶ .................................................. B01D 17/032
[52] U.S. Cl. ........................... 210/93; 210/95; 210/104; 210/114; 210/534; 210/119; 210/123; 137/203
[58] Field of Search ............................... 210/93, 95, 104, 210/112, 114, 119, 123, 172, 533, 534; 137/172, 192, 203, 558

[56] References Cited

U.S. PATENT DOCUMENTS

| | | | |
|---|---|---|---|
| 2,626,054 | 1/1953 | Henigman | 210/95 |
| 2,844,254 | 7/1958 | Ansley . | |
| 4,264,442 | 4/1981 | Jackson . | |
| 4,447,321 | 5/1984 | Jackson . | |
| 4,611,627 | 9/1986 | Eidsvoog . | |
| 5,139,653 | 8/1992 | Ludlam . | |

FOREIGN PATENT DOCUMENTS

| | | |
|---|---|---|
| 0 034 689 | 2/1989 | European Pat. Off. . |
| 671 406 | 12/1929 | France . |
| 1 285 077 | 1/1962 | France . |
| 1 516 420 | 1/1968 | France . |
| 2450715 | 10/1974 | Germany ............................ 210/123 |
| 362 466 | 12/1931 | United Kingdom . |
| 1 072 467 | 6/1967 | United Kingdom . |
| 1 600 271 | 10/1981 | United Kingdom . |
| 2 236 960 | 4/1991 | United Kingdom . |

*Primary Examiner*—Matthew O. Savage
*Attorney, Agent, or Firm*—Pillsbury Madison & Sutro, LLP

[57] ABSTRACT

The present invention relates to a system which makes it possible to remove undesirable liquids, generally an aqueous phase, which precipitate to the bottom of tanks for storing liquid products. Use is made of a drainage device (30) which comprises a concave body (31), a seat (26), and an interface float (8) which has a plug portion (25). This interface float (8) is designed to sink into the product and to float on the aqueous phase. As the level of the aqueous phase drops, the plug portion (25) settles sealingly on the seat (26), halting the drainage operation since all the accumulated aqueous phase has already been drained off. The drainage system may be automatic or manual. In the former case, use is made of a sensor (12) for detecting the presence of an aqueous phase and commanding the process of opening a shut-off valve (11) and allowing drainage of the accumulated aqueous phase. In the manual case, an operator periodically checks for the presence of an aqueous phase inside the storage tank (1), through a port (28) for inspecting the level. If such a phase were to accumulate, he opens a manual shut-off valve (29) so as to allow all the accumulated aqueous phase to drain away.

10 Claims, 4 Drawing Sheets

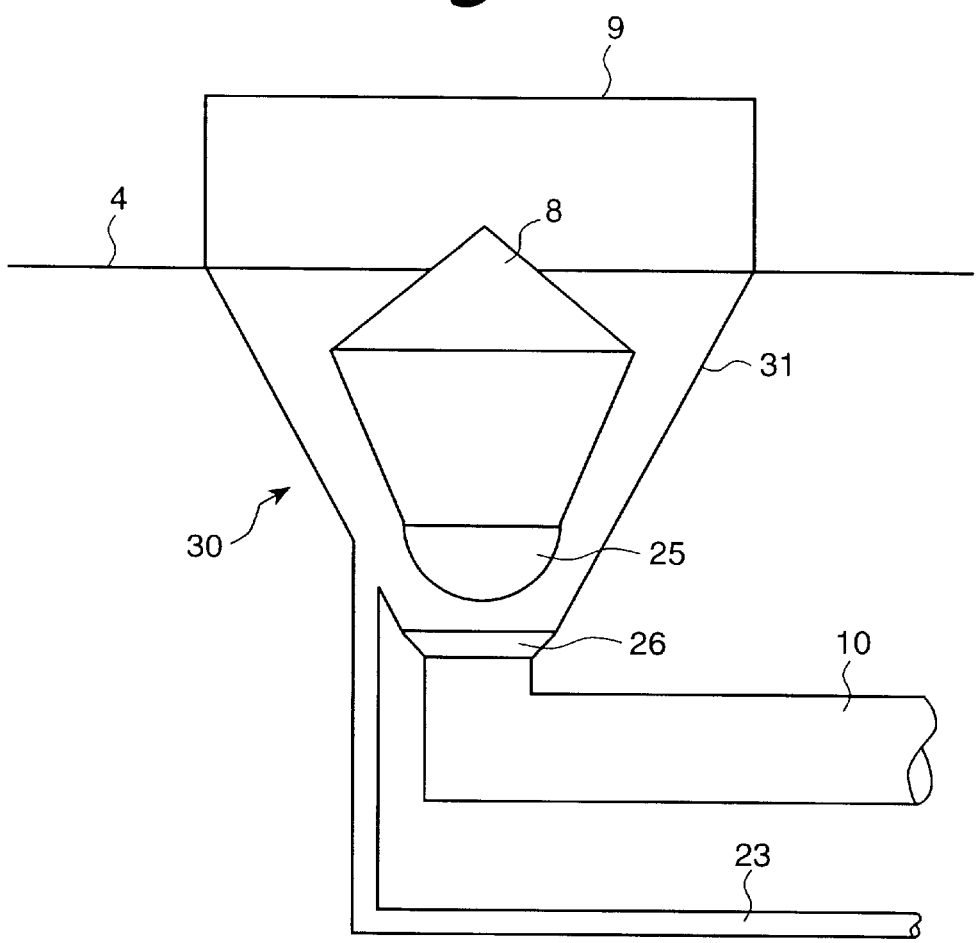

# SYSTEM FOR DRAINING A LIQUID STORAGE TANK

FIELD OF THE INVENTION

The present invention relates to equipment for draining precipitated liquids, especially water, which collect at the bottom of a tank for storing liquids. The equipment of the present invention makes it possible to drain off the precipitated liquids which accumulate at the bottom of such a storage tank.

PRIOR ART

Storage tanks are often used in the petroleum industry and are essential to the functioning of an operational unit. They may, for example, be for storing crude oil, intermediate products or final products.

When the product is being stored in the tank, it is normal for there to be undesirable liquids, generally an aqueous phase which is usually heavier than the product being stored, deposited at the bottom of the tanks.

Delay in draining the aqueous phase out from the tank gives rise to a number of problems. There may be a loss in product storage capacity, due to the formation of a layer of sludge. There may be corrosion of the bottom caused by the accumulation of the aqueous phase. There may be an interruption of production operations in order to allow the storage tank to be cleaned or even the replacement of the damaged bottom of the tank. It may be necessary to re-paint the metal plates making up the bottom of the tank in order to protect them against corrosion. Also, there may be a need to install sacrificial anodes in the internal part of the bottom of the tank in order to provide protection against corrosion.

It is worth pointing out that, before the bottom of the storage tanks can be painted, it is necessary to remove the corrosion with a sand jet or water jet, and then to apply several coats of special protective paint, which requires production to be interrupted for a number of days until the tank can be used once again. Such a painting operation is fairly costly.

The present invention proposes the adoption of a system, for draining a tank for storing liquids, which may be automatic or manual and prevents the accumulation of an aqueous phase at the bottom of the tank.

SUMMARY OF THE INVENTION

A first aspect of the present invention provides a system for draining a liquid storage tank, which is intended to promote removal, from inside the storage tank, of denser phase which is deposited in the bottom of the tank below a less dense phase which is not to be drained, characterized in that it is operated automatically and comprises the following components:

a) a drainage device to be fitted at the lowest level of said liquid storage tank, said drainage device comprising a concave body which ends in a seat, an interface float which sinks into the less dense phase and floats on the denser phase and thus prevents the formation of a vortex when the denser phase is being drained off, means actuated by the float for plugging the seat, and stop means which limits the travel of the interface float inside the drainage device but allows the passage of liquids;

b) a drainage line connecting the seat of the drainage device to a drainage box which is connected to a drain line;

c) a shut-off valve fitted in the drainage line and having an actuator which is intended to control the flow of liquid which passes to the drainage box;

d) a pressure-equalization line connecting the concave body of the drainage device to the drainage box;

e) a pressure-equalization valve fitted in the pressure-equalization line, said pressure-equalization valve having an actuator and functioning to promote the equalization of the pressures below and above the interface float after the plugging means has settled on the seat of the drainage device; and f) a sensor to be fitted on the side wall of the storage tank slightly above the level of the drainage device, and functioning to detect the presence of the denser phase and to emit a command signal to the actuator to open the shut-off valve for a predetermined period of time which makes it possible to drain off to the drainage box the denser phase which has accumulated in the drainage line; wherein, after a predetermined period of time during which the shut-off valve has remained closed, the sensor emits a command signal to the actuator to open the pressure-equalization valve for a predetermined period of time, which causes an equalization of the pressures to which the upper and lower parts of the interface float are subjected, enabling said interface float to float again on the denser phase, thereby initiating a new drainage flow.

A second aspect of the invention provides a system for draining a liquid storage tank which is intended to promote removal, from inside the storage tank, of a denser phase which is deposited in the bottom of the tank below a less dense phase, characterized in that it is operated manually and comprises the following components:

a) a drainage device to be fitted at the lowest level of said liquid storage tank, said drainage device comprising a concave body which ends in a seat, an interface float which sinks into the less dense phase and floats on the denser phase and thus prevents the formation of a vortex when denser phase is being drained off, means actuated by said interface float for plugging the seat, and stop means which limits the travel of the interface float inside the drainage device but allows the passage of liquids;

b) a drainage line connecting the seat of the drainage device to a drainage box which is connected to a drain line;

c) a first manual shut-off valve fitted in the drainage line and intended to control the flow of liquid which passes to the drainage box;

d) a pressure-equalization line connecting the concave body of the drainage device to the drainage box;

e) a second manual shut-off valve fitted in the pressure-equalization line, and operative to promote the equalization of the pressures below and above the interface float after the plugging means has settled on the seat of the drainage device; and f) a level gauge, for inspecting the liquid level in the tank, intended to be fitted in the bottom of the side wall of the storage tank slightly above the level of the drainage device, and operative to enable an operator to detect the presence of aqueous phase in the bottom of the storage tank, whereupon the operator can open the first manual shut-off valve and keep it open until the end of the drainage operation, close it at that end of the drainage operation, and subsequently open the second manual shut-off valve and keep it open for a predetermined period of time to equalize the pressures to which the top and bottom of the interface float are subjected, thereby enabling the said interface float to float again on the denser phase, thereby initiating a new drainage flow.

This interface float is designed to sink into the product and to float on top of the denser phase underneath the product. As the level of the denser phase drops, the plug portion of the interface float settles onto the seat, stopping the drainage operation since all the accumulated denser phase has now been drained off.

The drainage system may thus be manual or automatic. In the manual version, an operator periodically checks for the presence of an aqueous (denser) phase inside the storage tank via a port for inspecting the level. If such a phase were to accumulate, he opens a manual shut-off valve so as to allow all the accumulated aqueous (denser) phase to drain away.

In the automatic version, use is made of a sensor for detecting the presence of an aqueous (denser) phase and commanding the process of opening a shut-off valve and allowing drainage of the accumulated denser phase. A sensor may be fitted in the drainage line to detect an undesired passage of product (less dense phase) and to command closing of the shut-off valve which controls drainage in response to detection of product passing the sensor.

BRIEF DESCRIPTION OF THE DRAWINGS

The present invention will be better understood from the following description, given purely by way of example, with reference to the accompanying drawings, in which:

FIG. 4 shows a drainage device used in the system of the present invention, for draining tanks for storing liquids.

DESCRIPTION OF THE INVENTION

Figure 1:
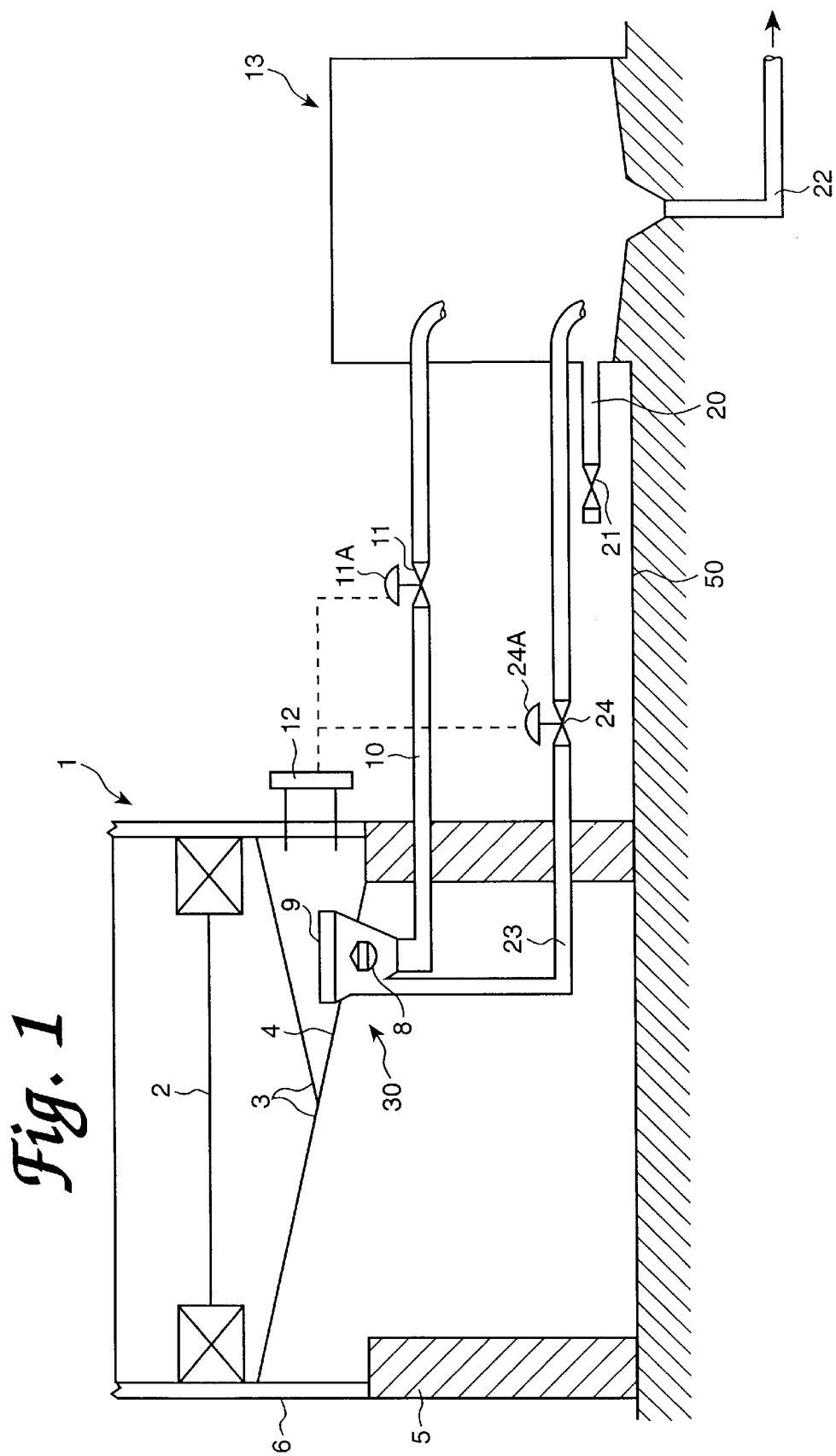
FIG. 1 shows a tank for storing liquids which is equipped with a system of the present invention, for automatic drainage of tanks for storing liquids.

FIG. 1 shows a storage tank 1 equipped with an automatic system according to the present invention, for draining tanks for storing liquids. The tank 1 has a side wall 6, a foundation ring 5, a floating roof 2, and a bottom 3 having its centre lower than the edges and also a ramp 4 which makes drainage more efficient. Any product, generally a hydrocarbon, can be stored inside the storage tank 1 and the fact that the roof 2 floats on the product prevents any inflammable gaseous phase from occurring above the liquid surface.

The system for draining liquid storage tanks may be used in any type of storage liquid tank, irrespective of the shape of the tank bottom; the type of tank mentioned above is chosen only to facilitate the description of the invention.

A drainage device 30 is fitted at the lowest part of the ramp 4, as close as possible to the foundation ring 5 of the storage tank 1; this is the lowest level at which there can be a deposit of liquid.

The drainage device 30, which may be seen better in FIG. 4, comprises a concave body 31 which may, for example, be frustoconical or polyhedral. Inside the concave body 31 there is an interface float 8 which has a plug portion 25 at the bottom. A guide 9 is fitted over the concave body 31 and its function is to serve as stop means to limit the upward travel of the interface float 8. The guide 9 may be constructed so as to allow the liquid to pass without difficulty to the inside of the drainage device 30.

At the bottom of the concave body 31 is a seat 26 which can be sealingly engaged by the plug portion 25 of the interface float 8. A drainage line 10 and a pressure-equalization line 23 are connected to the seat 26 of the drainage device 30. FIG. 1 shows that the drainage line 10 and the pressure-equalization line 23 extend beyond the foundation ring 5 of the storage tank 1 and end in the drainage box 13. A normally closed shut-off valve 11 having an actuator 11A is fitted in the drainage line 10, and a normally closed pressure-equalization valve 24, having an actuator 24A, is fitted in the pressure-equalization line 23.

The bottom of, the drainage box 13 has an outlet to the discharge line 22 through which the drained aqueous phase will drain off. It is expedient for the drainage box 13 to be as high as, or higher than, the useful height of the side walls of the containment basin 50 of the storage tank 1 so as to ensure that there will be no undesirable communication between the containment basin and the discharge line 22. A drain line 20, having a shut-off valve 21, is fitted in the bottom of the drainage box 13. This line 20 makes it possible for any drainage of the containment basin wall to be carried out via the drainage box 13. To do this, it is sufficient to open the shut-off valve 21. The containment basin 50, which is not part of the invention, is the area limited by depressions or walls (dykes) on the ground intended to contain the fluids of the tank in case of a leakage. In the drawings only a small part of it is shown.

A sensor 12 is fitted in the bottom of the side 6 of the storage tank 1 slightly above the level of the drainage device 30. Its function is to detect the presence of an aqueous phase and to emit a command signal to the actuator 24A of the pressure-equalization valve 24 and to the actuator 11A of the shut-off valve 11, as will be better understood below.

Operation of the system for draining liquid storage tanks, according to the present invention, is fairly simple. The storage tank 1 normally receives the product which it is desired to store. If there should be any precipitation of aqueous phase, this tends to deposit in the bottom of the storage tank 1 because it is denser than the product.

The interface float 8 is designed to float on the aqueous phase and to sink into the product thereabove. The drainage device 30 is located in the lower part of the storage tank 1, which results in the precipitated aqueous phase accumulating around it. When the interface float 8 floats on aqueous phase, the passage to the drainage line 10 is unobstructed, which makes it possible for the precipitated aqueous phase to pass through the line 10. This drained aqueous phase will be accumulating inside the drainage line 10 because the shut-off valve 11 is closed.

As time passes, the level of the precipitated aqueous phase will rise until it reaches the sensor 12 which, on detecting the presence of an aqueous phase, immediately emits a signal to the actuator 11A to command the opening of the shut-off valve 11 for a preestablished period of time sufficient to allow all the aqueous phase to drain off to the inside of the drainage line 10. The presence of the interface float 8 prevents the formation of a vortex inside the drainage device 30, which could wrongly give rise to drainage of product even though there might still be remaining aqueous phase to be drained off.

As the level of the aqueous phase inside the drainage device 30 drops, the interface float 8 will also drop, and its plug portion 25 approaches the seat 26. When all the aqueous phase has been drained off, the plug portion 25 will settle on the seat 26, closing the passage and preventing the outflow of product via the drainage line 10, thereby completing the drainage process. The pre-established period during for the shut-off valve 11 to remain open will then end, and the valve again closes.

As soon as more of the aqueous phase accumulates around the drainage device 30 the interface float 8 would tend to float again, due to its buoyancy, but meanwhile, owing to the action of the static head of product acting on the top of the interface float 8, such floating does not occur immediately.

To avoid this problem, it is necessary to equalize the pressures above and below the interface float 8. In order that such a pressure equalization may occur, after the predetermined period of time during which the shut-off valve 11 is closed the sensor 12 emits a signal to the actuator 24A to command opening of the pressure-equalization valve 24 for a predetermined period of time which is sufficient for pressure equalization to occur, after which the pressure-equalization valve 24 closes once again. At this point, the interface float 8 again floats on the aqueous phase, initiating a new drainage cycle.

Figure 2:
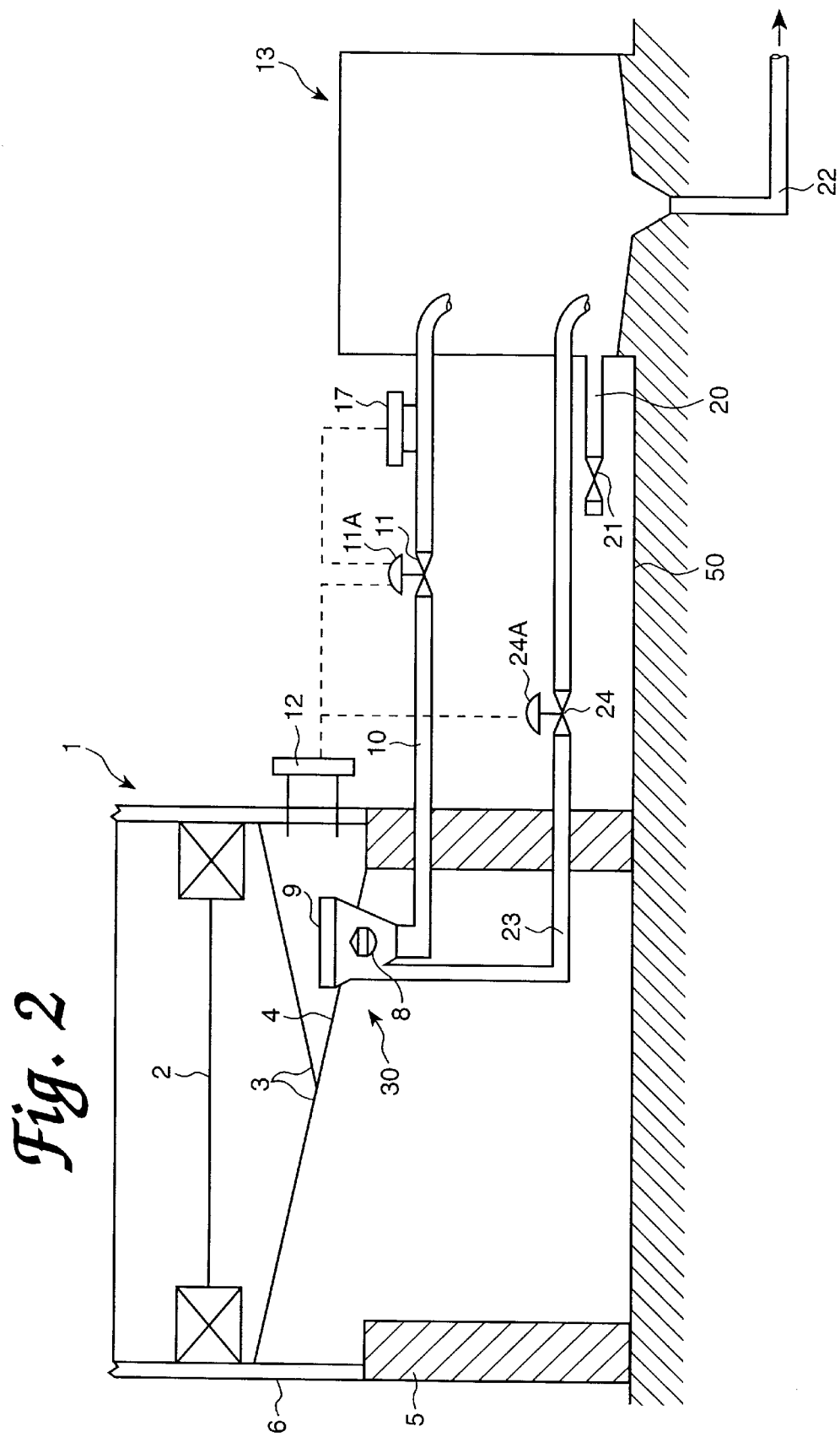
FIG. 2 shows a tank for storing liquids which is equipped with an alternative system of the present invention, for draining tanks for storing liquids.

FIG. 2 shows a variation of the system, according to the present invention, for draining tanks for storing liquids. With the aim of providing a safer drainage operation, a sensor 17 is fitted in the drainage line 10. Its function is to detect an undesired passage of product through the drainage line 10, which would signify an operational failure of the drainage device 30. In this case, the sensor 17 would emit a command signal to the actuator 11A, which would immediately close the shut-off valve 11, thereby interrupting an undesired flow of product to the drainage box 13. The sensor 17 may also send a signal to a remote panel installed in a control room, for example, where some type of alarm would alert the operator in charge to the problem so that the operator can immediately take the necessary measures to rectify it.

Various types of sensor may be used to function as the sensor 12. It is possible, for example, to use a liquid level switch, a conductivity sensor or a capacitive sensor.

Similarly, use may also be made of various types of sensor for the sensor 17. Purely by way of example, use may be made of a conductivity sensor or a capacitive sensor.

It is unnecessary to state that the types of sensor mentioned in the above two paragraphs are merely illustrative examples and may not in any way be regarded as limiting the present invention.

Figure 3:
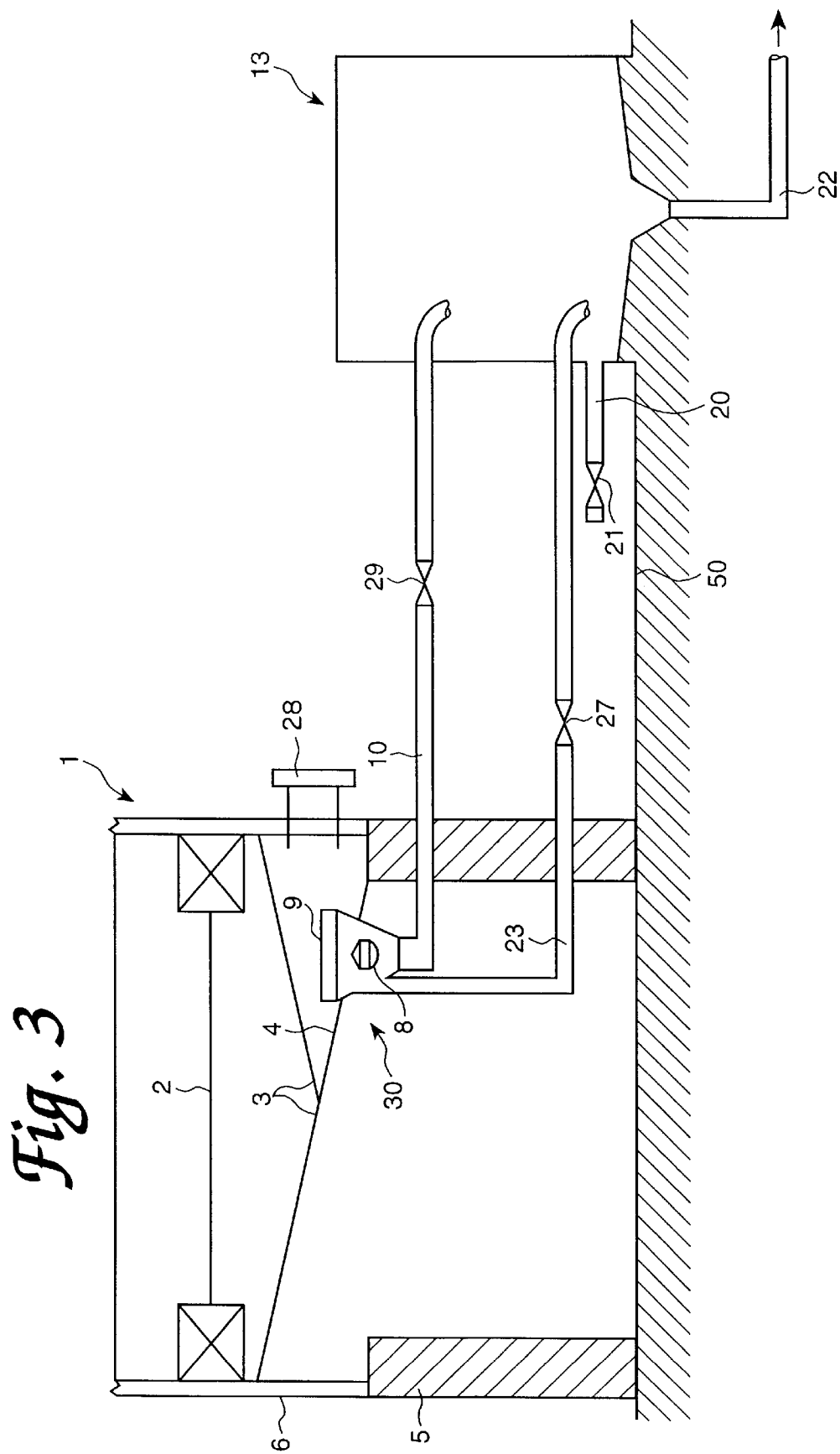
FIG. 3 shows a tank for storing liquids which is equipped with a further alternative system of the present invention, for draining tanks for storing liquids.

The drainage system for tanks for storing liquids may also be operated manually. To this end, as shown in FIG. 3, a liquid level gauge 28 for inspecting the level may be fitted instead of the sensor 12, a manual shut-off valve 29 instead of the actuated shutoff valve 11, and a manual shut-off valve 27 instead of the pressure-equalization valve 24.

The system would then be operated by an operator who would periodically check for the presence of an aqueous phase in the level indicator. If such a phase were to accumulate, it would signify the need to drain off the aqueous phase that had accumulated in the bottom of the tank. To this end, it would suffice to open the manual shut-off valve 29, which would make it possible for all the aqueous phase to drain off to the drainage box 13. The drainage device 30 would operate exactly as described above, enabling all the accumulated aqueous phase to drain off.

When the operator detects the fact that there is no more aqueous phase to drain off to the drainage box 13, he would next close the manual shut-off valve 29 and would then open the manual shut-off valve 27 for a preestablished period of time, with the aim of equalizing the pressures above and below the interface float 8, enabling the float to float again on the accumulated aqueous phase, thereby initiating a new drainage cycle.

It is preferable that the plug 25 is formed on the interface float 8, but it is also possible that the float actuates an external plug, and the aforesaid description should not be taken as a limitation of the invention.

What is claimed is:

1. System for draining a liquid storage tank, which is intended to promote removal, from inside the storage tank, of denser phase which is deposited in a bottom of the tank below a less dense phase which is not to be drained, characterized in that it is operated automatically and comprises the following components:

a) a drainage device (30) to be fitted at a lowest level of said liquid storage tank (1), said drainage device (30) comprising a concave body (31) which ends in a seat (26), an interface float (8) which sinks into the less dense phase and floats on the denser phase and thus prevents the formation of a vortex when the denser phase is being drained off, means (25) actuated by the float (8) for plugging the seat (26), and stop means (9) which limits the travel of the interface float (8) inside the drainage device (30) but allows the passage of liquids;

b) a drainage box (13); a drainage line (10) connecting the seat (26) of the drainage device (30) to the drainage box (13) which is connected to a drain line (22);

c) a shut-off valve (11) fitted in the drainage line (10) and having an actuator (11A) which is intended to control the flow of liquid which passes to the drainage box (13);

d) a pressure-equalization line (23) connecting the concave body (31) of the drainage device (30) to the drainage box (13);

e) a pressure-equalization valve (24) fitted in the pressure-equalization line (23), said pressure-equalization valve (24) having an actuator (24A) and functioning to promote the equalization of the pressures below and above the interface float (8) after the plugging means (25) has settled on the seat (26) of the drainage device (30); and f) a sensor (12) to be fitted on a side wall (6) of the storage tank (1) slightly above the concave body of the drainage device (30), and functioning to detect the presence of the denser phase and to emit a command signal to the actuator (11A) to open the shut-off valve (11) for a predetermined period of time which makes it possible to drain off to the drainage box (13) the denser phase which has accumulated in the drainage line (10); wherein, after a predetermined period of time during which the shut-off valve (11) has remained closed, the sensor (12) emits a command signal to the actuator (24A) to open the pressure-equalization valve (24) for a predetermined period of time, which causes an equalization of the pressures to which the upper and lower parts of the interface float (8) are subjected, enabling said interface float (8) to float again on the denser phase, thereby initiating a new drainage flow.

2. System for draining a liquid storage tank, according to claim 1, wherein a height of the drainage box (13) is greater than a height of a containment basin of the storage tank (1), and in that the drainage box has, at its bottom, said drainage line (20) with a shut-off drain valve (21), these enabling the containment basin of the storage tank (1) to be drained through the drainage box (13) when the drain valve (21) is opened.

3. System for draining a liquid storage tank, according to claim 1, wherein said plugging means comprise a valve portion (25) on a lower face of said interface float and, intended to settle on the seat (26).

4. System for draining a liquid storage tank, according to claim 1, wherein it further includes a sensor (17), fitted in the drainage line (10) and operative to detect passage of less dense phase through this drainage line (10), which would signify an operational failure of the drainage device (30), and in response to detection of such passage to emit a command signal to the actuator (11A) to command closure of the shut-off valve (11), thereby halting drainage.

5. System for draining a liquid storage tank, according to claim 4, wherein a remote panel is installed in a control room receiving the signal emitted by the sensor (17) and in response thereto to signal an alarm.

6. System according to claim 4, wherein a height of the drainage box (13) is greater than a height of a containment basin of the storage tank (1), and in that a drainage box has, at its bottom, a drainage line (20) with a shut-off drain valve (21), these enabling the containment basin of the storage tank (1) to be drained through the drainage box (13) when the drain valve (21) is opened.

7. System according to claim 4, wherein said plugging means comprise a valve portion (25) on a lower face of said interface float and, intended to settle on the seat (26).

8. System for draining a liquid storage tank which is intended to promote removal, from inside the storage tank, of a denser phase which is deposited in a bottom of the tank below a less dense phase, characterized in that it is operated manually and comprises the following components:

a) a drainage device (30) to be fitted at a lowest level of said liquid storage tank (1), said drainage device (30) comprising a concave body (31) which ends in a seat (26), an interface float (8) which sinks into the less dense phase and floats on the denser phase, means (25) actuated by said interface float for plugging the seat (26), and stop means (9) which limits the travel of the interface float (8) inside the drainage device (30) but allows the passage of liquids;

b) a drainage box (13); a drainage line (10) connecting the seat (26) of the drainage device (30) to the drainage box (13) which is connected to a drain line (22);

c) a first manual shut-off valve (29) fitted in the drainage line (10) and intended to control the flow of liquid which passes to the drainage box (13);

d) a pressure-equalization line (23) connecting the concave body (31) of the drainage device (30) to the drainage box (13);

e) a second manual shut-off valve (27) fitted in the pressure-equalization line (23), and operative to promote the equalization of the pressures below and above the interface float (8) after the plugging means (25) has settled on the seat (26) of the drainage device (30);

f) a level gauge (28), for inspecting the liquid level in the tank, intended to be fitted in a bottom of a side wall (6) of the storage tank (1) slightly above the concave body of the drainage device (30), and operative to enable an operator to detect the presence of aqueous phase in the bottom of the storage tank (1), whereupon the operator can open the first manual shut-off valve (29) and keep it open until the end of the drainage operation, close it at that end of the drainage operation, and subsequently open the second manual shut-off valve (27) and keep it open for a predetermined period of time to equalize the pressures to which the top and bottom of the interface float (8) are subjected, thereby enabling the said interface float (8) to float again on the denser phase, thereby initiating a new drainage flow.

9. System for draining a liquid storage tank, according to claims 8, wherein a height of the drainage box (13) is greater than the useful height of a containment basin of the storage tank (1), and in that the drainage box has, at its bottom, said drainage line (20) with a shut-off drain valve (21), these enabling the containment basin of the storage tank (1) to be drained through the drainage box (13) when the drain valve (21) is opened.

10. System for draining a liquid storage tank, according to claim 8, wherein said plugging means comprise a valve portion (25) on a lower face of said interface float and, intended to settle on the seat (26).

* * * * *